Figure 1:
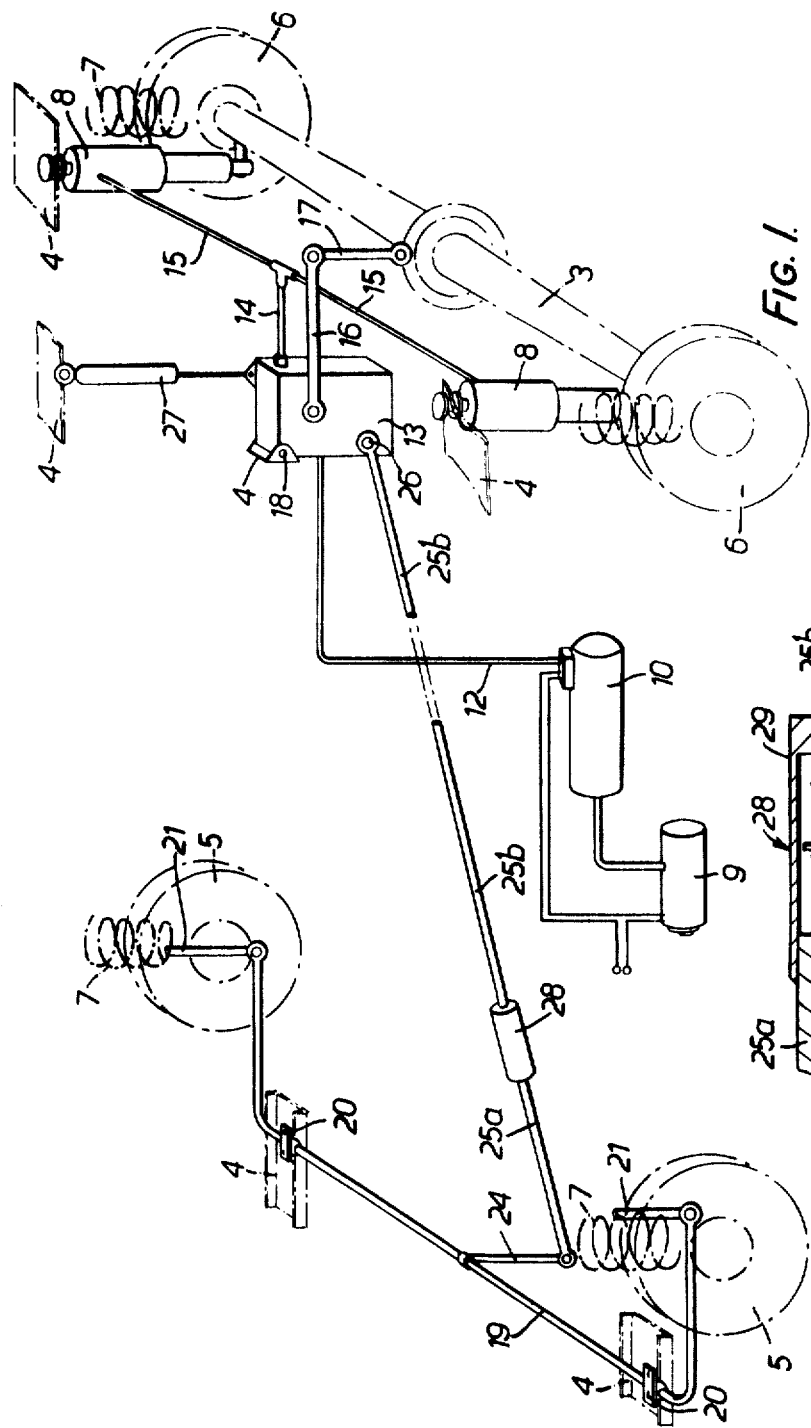

United States Patent

[11] 3,595,597

[72] Inventor Graham J. Wenham
 Brimingham, England
[21] Appl. No. 830,465
[22] Filed June 4, 1969
[45] Patented July 27, 1971
[73] Assignee Girling Limited
[32] Priority June 5, 1968
[33] Great Britain
[31] 26,786/68

[54] VEHICLE LEVELLING SYSTEMS
 3 Claims, 2 Drawing Figs.
[52] U.S. Cl. .................................................. 280/124
[51] Int. Cl. .................................................. B60g 11/26
[50] Field of Search .................................................. 280/124 F

[56] References Cited
UNITED STATES PATENTS
3,071,394 1/1963 Miller........................... 280/124 F
3,006,657 10/1961 Augustin....................... 280/124 F Primary Examiner— Philip Goodman
Attorney— Scrivener, Parker, Scrivener and Clarke ABSTRACT: A vehicle suspension system of the kind in which the sprung mass of the vehicle is yieldably supported from road wheels adjacent the two ends of the vehicle and the support means associated with the road wheels adjacent one end include a fluid-pressure support device, the fluid pressure in that device being controlled automatically to compensate for variations in the loading of the vehicle by a levelling valve which is responsive to variations in the height of the sprung mass adjacent said one end of the vehicle; the position of the datum level from which the levelling valve measures the height of the unsprung mass is automatically adjusted in accordance with variations in the height of the sprung mass of the vehicle adjacent the other end thereof; the sprung mass of the vehicle can thus be kept level fore and aft.

VEHICLE LEVELLING SYSTEMS

This invention relates to vehicle suspension systems in which the sprung mass of the vehicle is supported from the road wheels by means which include fluid pressure suspension devices and means are provided for adjusting the fluid pressure in these suspension devices to compensate for variations in the loading of the vehicle.

In cases where the variable load is wholly or largely supported from the road wheels adjacent one end of the vehicle (so that a variation in the loading tends to cause a substantial change in the height of the unsprung mass where it is supported from those wheels, but little or no change in height where it is supported from the other wheels of the vehicle) such fluid pressure suspension devices may be included in the support means associated with the first-mentioned road wheels and the fluid pressure in those suspension devices may be controlled automatically by a levelling valve which is responsive to variations in the clearance adjacent the first axle between the sprung and unsprung masses of the vehicle and which operates to vary the fluid pressure in the suspension devices in such a way as to restore that clearance to its original value, thus maintaining the sprung mass at a constant height. However, variations in the loading of the vehicle will usually cause some change in the height of the sprung mass adjacent the other road wheels also, so that with a system of the character described the end of the vehicle remote from the levelling valve will vary in height with variations in the loading of the vehicle. In the case of softly sprung vehicles and those with a high ratio of overall length to wheelbase, the resultant changes in the attitude of the sprung mass can be severe and may result in an unacceptable degree of headlamp misalignment.

This difficulty can, of course, be overcome by providing in association with each set of road wheels fluid pressure suspension devices and a levelling valve which responds to variations in the height of the sprung mass at that end of the vehicle and controls the fluid pressure in the suspension devices at that end of the vehicle. However, such a duplication of the fluid pressure suspension system greatly increases the overall cost.

In accordance with the present invention the fluid pressure in the suspension devices associated with the road wheels adjacent one end of the vehicle is controlled by a levelling valve which is responsive to variations in the height of the sprung mass of the vehicle adjacent those wheels above a datum line which, instead of being fixed relative to the unsprung mass of the vehicle, is adjusted in height in accordance with variations in the height of the sprung mass of the vehicle where it is supported from the road wheels adjacent the other end of the vehicle. The sprung mass of the vehicle can thus be kept level in spite of variations in the load (provided that these are within the operating limits of the system) though the clearance between the sprung and unsprung masses will vary to some extent with the load.

Figure 2:
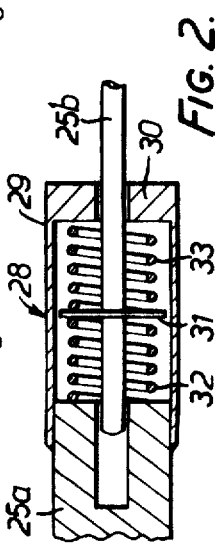

One particular form of vehicle suspension system in accordance with the invention is, by way of example, shown in the accompanying drawing and described below. In the drawing:

FIG. 1 is a diagrammatic perspective view of the suspension system as a whole; and FIG. 2 is a sectional view of a detail.

Referring to the drawing, the suspension system illustrated is appropriate for use in a vehicle in which the variable load is largely carried in the neighborhood of the rear axle 3. The sprung mass of the vehicle (various fragmentary parts of which are shown in the drawing designated by the reference numeral 4) is supported from the front wheels 5 and rear wheels 6 by springs, indicated diagrammatically at 7, and additionally is supported from the rear wheels by extensible fluid pressure devices 8. Fluid under pressure is supplied to these devices by an air compressor 9 delivering air into an accumulator vessel 10, from which the air flows through a pipe 12 to the inlet of a levelling valve 13, whose outlet is connected by pipes 14, 15 to the suspension devices 8. Levelling valve 13 includes an operating arm 16, angularly movable relative to the body of the valve and coupled by a link 17 to the center of the rear axle 3. When as a result of an increase in the load, the body of the levelling valve moves downwardly towards the rear axle, the operating arm 16 (which is shown in its normal or neutral position) is turned counterclockwise relative to the valve body, thus actuating the valve to increase the fluid pressure in the devices 8, which consequently expand and raise the sprung mass of the vehicle. Similarly, a decrease in load, causing upward movement of valve 13, results in clockwise rotation of arm 16, operating the valve to reduce the pressure in the devices 8 and allow the sprung mass of the vehicle to move down again. In each case the movement continues until arm 16 has been restored to its original position relative to the body of valve 13. In a conventional suspension of the character thus far described, the body of the levelling valve 13 is fixedly secured to the sprung mass of the vehicle and the devices 8 accordingly always operate to return this mass to the same height above the rear axle, regardless of the height of the front end relative to the front wheels 5.

In the system in accordance with the present invention illustrated in the drawing the body of the levelling valve 13 is mounted upon a pivot 18 and is adjusted about this pivotal mounting in accordance with variations in the height of the front end of the sprung mass. Extending transversely of the vehicle at the forward end thereof is an antiroll bar 19, rotatably supported at 20. The two ends of this bar extend rearwardly to form torque arms which are connected by links 21 to the front wheel assemblies. Secured to the center point of the antiroll bar 19 is a lever arm 24, which is coupled by a rearwardly extending connecting bar 25 to a point 26 on the levelling valve 13, situated below the pivotal mounting 18 of the valve. When the front end of the sprung mass of the vehicle moves downwardly relative to the front wheels, the arm 24 is turned counterclockwise to an extent proportional to the arithmetic mean of the front suspension deflections. The rearward thrust thus imparted to the connecting bar 25 turns the body of the levelling valve 13 counterclockwise about its pivot 18 thus effectively adjusting the datum level relative to which the levelling valve operates. It will be appreciated that with the valve turned counterclockwise from the position shown, operating arm 16 will be in its neutral position relative to the valve when the rear end of the sprung mass is at a lesser height above the rear axle, than the height at which the arm reaches its neutral position when the valve is in the position illustrated.

In order to prevent the angular position of the levelling valve 13 from being changed by transient movement and vibration of the front suspension, a damper 27 is connected to the valve and a lost motion device 28 is included in the connecting bar 25. A suitable construction of the lost motion device 28 is shown diagrammatically in FIG. 2 of the drawing. The front portion 25a of the connecting bar has fast to its rear end a housing 29 and the forward end of the rear portion 25b of the connecting bar passes slidably through the end wall 30 of this housing. Within the housing the portion 25b carries a collar 31 and a pair of springs 32, 33 in compression bear against opposite faces of this collar, the springs abutting respectively against the end of the portion 25a and the end wall 30 of the housing.

Although only shown in the forward link, a device similar to device 28 could also be included in the linkage 16, 17. Furthermore, the function of the damper 27 in conjunction with the lost motion device 28 could be built into the levelling valve 13.

I claim:

1. In a vehicle suspension system comprising: means yieldably supporting the sprung mass of the vehicle from road wheels adjacent the front and rear ends respectively of the vehicle; said support means associated with the road wheels adjacent one end of the vehicle including at least one fluid pressure support device; means for supplying fluid under pressure to said support device; a levelling valve for controlling the pressure of the fluid supplied to said support device; said levelling valve being responsive to variations in the height adjacent said one end of the vehicle of the sprung mass of the vehicle relative to a datum level; the improvement which comprises: means connected to the levelling valve for changing the datum level relative to which the levelling valve operates, adjusting means operatively connecting the datum level changing means with the opposite end of the vehicle, said adjusting means being responsive to variations in the height of the sprung mass of the vehicle adjacent said other end for automatically varying said datum level changing means.

2. A vehicle suspension system as set forth in claim 1, said levelling valve comprising a valve body, and an actuating arm movable relative to said body to control the pressure of fluid supplied to said support device; said actuating arm being coupled to the road wheels adjacent said one end of the vehicle, said valve body being adjustably supported on the sprung mass of the vehicle, and said adjusting means operating to vary the position of said valve body relative to said sprung mass.

3. A vehicle suspension system as set forth in claim 2, and further comprising a damper yieldably opposing movement of said valve body relative to said sprung mass and a lost motion device included in said adjusting means.